United States Patent
Bogart et al.

(10) Patent No.: US 7,139,831 B1
(45) Date of Patent: Nov. 21, 2006

(54) MULTIPLE PROTOCOL CHECKPOINT MANAGEMENT

(75) Inventors: Tom L. Bogart, Lehi, UT (US); David Arthur Eatough, Provo, UT (US); Peter E. Johnson, Lehi, UT (US); Gregory P. Olsen, Lindon, UT (US); Chris D. Russell, American Fork, UT (US)

(73) Assignee: Intel Corporation, Santa Clara, CA (US)

( * ) Notice: Subject to any disclaimer, the term of this patent is extended or adjusted under 35 U.S.C. 154(b) by 1083 days.

(21) Appl. No.: 09/677,461

(22) Filed: Sep. 29, 2000

(51) Int. Cl.
*G06F 15/16* (2006.01)

(52) U.S. Cl. .................. 709/237; 709/217; 709/219; 709/231; 709/235

(58) Field of Classification Search ........ 709/217–219, 709/200, 201, 203, 231, 235–237; 395/726; 455/435; 370/352
See application file for complete search history.

(56) References Cited

U.S. PATENT DOCUMENTS

| | | | |
|---|---|---|---|
| 5,784,622 A * | 7/1998 | Kalwitz et al. ............. | 710/200 |
| 6,262,982 B1 * | 7/2001 | Donahue et al. ............ | 370/352 |
| 6,385,647 B1 * | 5/2002 | Willis et al. ................ | 709/217 |
| 2001/0046862 A1 * | 11/2001 | Coppinger et al. ......... | 455/435 |

* cited by examiner

*Primary Examiner*—Jason Cardone
*Assistant Examiner*—Mitra Kianersi
(74) *Attorney, Agent, or Firm*—Blakely, Sokoloff, Taylor & Zafman LLP

(57) ABSTRACT

Data is distributed over a network using a first network protocol, for example, a non-reliable protocol. The non-reliable protocol (e.g., multicast) is used to distribute the data from a host system to multiple target systems with reduced overhead as compared to typical reliable protocols. Portions of the data that are not received by one or more of the target systems are requested and transmitted via a second network protocol (e.g., hypertext transport protocol, or HTTP). In one embodiment, the target systems maintain a checkpoint management service that determines the portions of data not received. In an alternative embodiment, target systems evaluate data received to determine whether a portion of the transmitted data was not received.

29 Claims, 4 Drawing Sheets

MULTIPLE PROTOCOL CHECKPOINT MANAGEMENT

FIELD OF THE INVENTION

The invention relates to data transfer. More particularly, the invention relates to data transfer techniques using multiple protocols.

BACKGROUND OF THE INVENTION

With the recent growth of the Internet and other networks, data transfer between computers has becoming increasingly useful for communications and other purposes. Different network protocols have been developed for data transfer in different network environments and for different purposes. In general, data can be transferred over a network using reliable or non-reliable protocols. Reliable protocols are typically used for point to point communications and non-reliable protocols are typically used for data transfer to multiple recipients.

Reliable protocols are those that guarantee delivery of data packets. Transmission Control Protocol (TCP) along with Internet Protocol (IP), referred to a TCP/IP can be used to reliably transmit data. Real-time Transport Protocol (RTP) can also be used with IP to provide reliable data communication. Other reliable protocols also exist.

Multicasting of network data provides a non-reliable, but widely distributed method for communicating network communication. However, when using multicasting to transmit data, delivery of all of the data is not guaranteed. Thus, multicasting is used where loss of some data is not critical, for example, audio and video streams. Broadcasting can also be used for non-reliable data transport.

While both reliable and non-reliable protocols can be used for appropriate communications, neither reliable nor non-reliable protocols provide efficient use of network bandwidth.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for transmitting data across a network using multiple protocols are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Data is distributed over a network using a first network protocol, for example, a non-reliable protocol. The non-reliable protocol (e.g., multicast) is used to distribute the data from a host system to multiple target systems with reduced overhead as compared to typical reliable protocols. Portions of the data that are not received by one or more of the target systems are requested and transmitted via a second network protocol (e.g., hypertext transport protocol, or HTTP). In one embodiment, the target systems maintain a checkpoint management service that determines the portions of data not received. In an alternative embodiment, target systems evaluate data received to determine whether a portion of the transmitted data was not received.

For reasons of simplicity, certain network protocols are used herein to describe data distribution using multiple protocols. However, the techniques described herein can be used with any network protocol (e.g., IP, IPX, NetBeui), any number of network sessions, and over any period of time (e.g. network sessions do not have to occur within the same hour, day, week, and so on). In the description that follows, the initial data transfer is generally described as a non-reliable data transfer and the subsequent data transfers are accomplished by reliable network protocols. However, either reliable or non-reliable network protocols can be used for the initial transfer as well as for subsequent data transfers.

Figure 1:
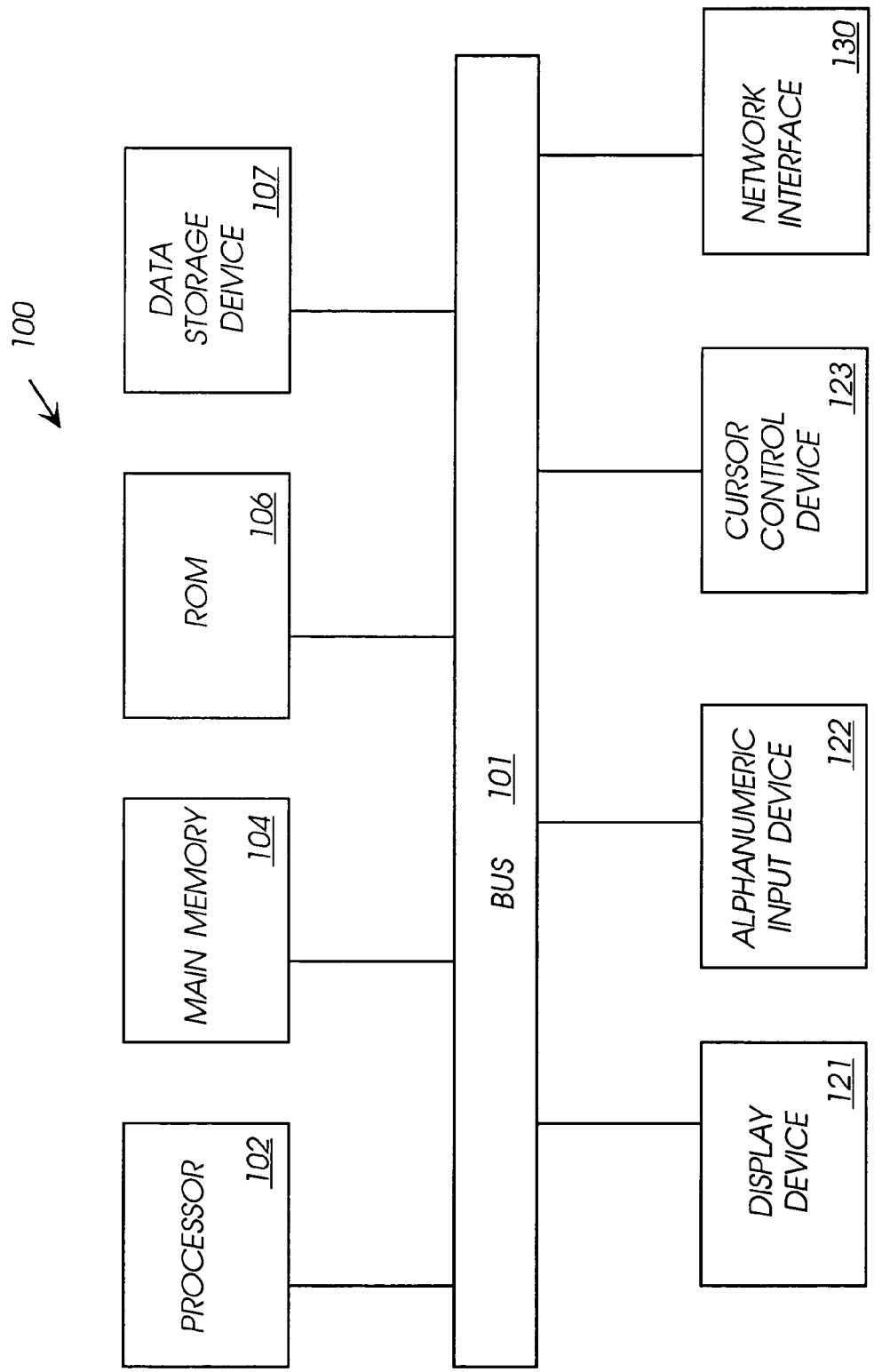
FIG. 1 is a block diagram of one embodiment of a computer system suitable to practice the invention.

FIG. 1 is a block diagram of one embodiment of a computer system. The computer system illustrated in FIG. 1 is intended to represent a range of computer systems. Alternative computer systems can include more, fewer and/or different components.

Computer system 100 includes bus 101 or other communication device to communicate information, and processor 102 coupled to bus 101 to process information. While computer system 100 is illustrated with a single processor, computer system 100 can include multiple processors and/or co-processors. Computer system 100 further includes random access memory (RAM) or other dynamic storage device 104 (referred to as main memory), coupled to bus 101 to store information and instructions to be executed by processor 102. Main memory 104 also can be used to store temporary variables or other intermediate information during execution of instructions by processor 102.

Computer system 100 also includes read only memory (ROM) and/or other static storage device 106 coupled to bus 101 to store static information and instructions for processor 102. Data storage device 107 is coupled to bus 101 to store information and instructions. Data storage device 107 such as a magnetic disk or optical disc and corresponding drive can be coupled to computer system 100.

Computer system 100 can also be coupled via bus 101 to display device 121, such as a cathode ray tube (CRT) or liquid crystal display (LCD), to display information to a computer user. Alphanumeric input device 122, including alphanumeric and other keys, is typically coupled to bus 101 to communicate information and command selections to processor 102. Another type of user input device is cursor control 123, such as a mouse, a trackball, or cursor direction keys to communicate direction information and command selections to processor 102 and to control cursor movement on display 121.

Computer system 100 further includes network interface 130 to provide access to a network, such as a local area network. Instructions are provided to memory from a storage device, such as magnetic disk, a read-only memory (ROM) integrated circuit, CD-ROM, DVD, via a remote connection (e.g., over a network via network interface 130) that is either wired or wireless, etc. In alternative embodiments, hard-wired circuitry can be used in place of or in combination with software instructions to implement the present invention. Thus, the present invention is not limited to any specific combination of hardware circuitry and software instructions.

A machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As described in greater detail below, computer systems can be used to transmit and receive network data using multiple protocols. Other types of electronic systems can be used to transmit and/or receive data over a network. For example, set top boxes, personal digital assistants, cellular telephones, pager can be used to transmit and/or receive data.

Figure 2:
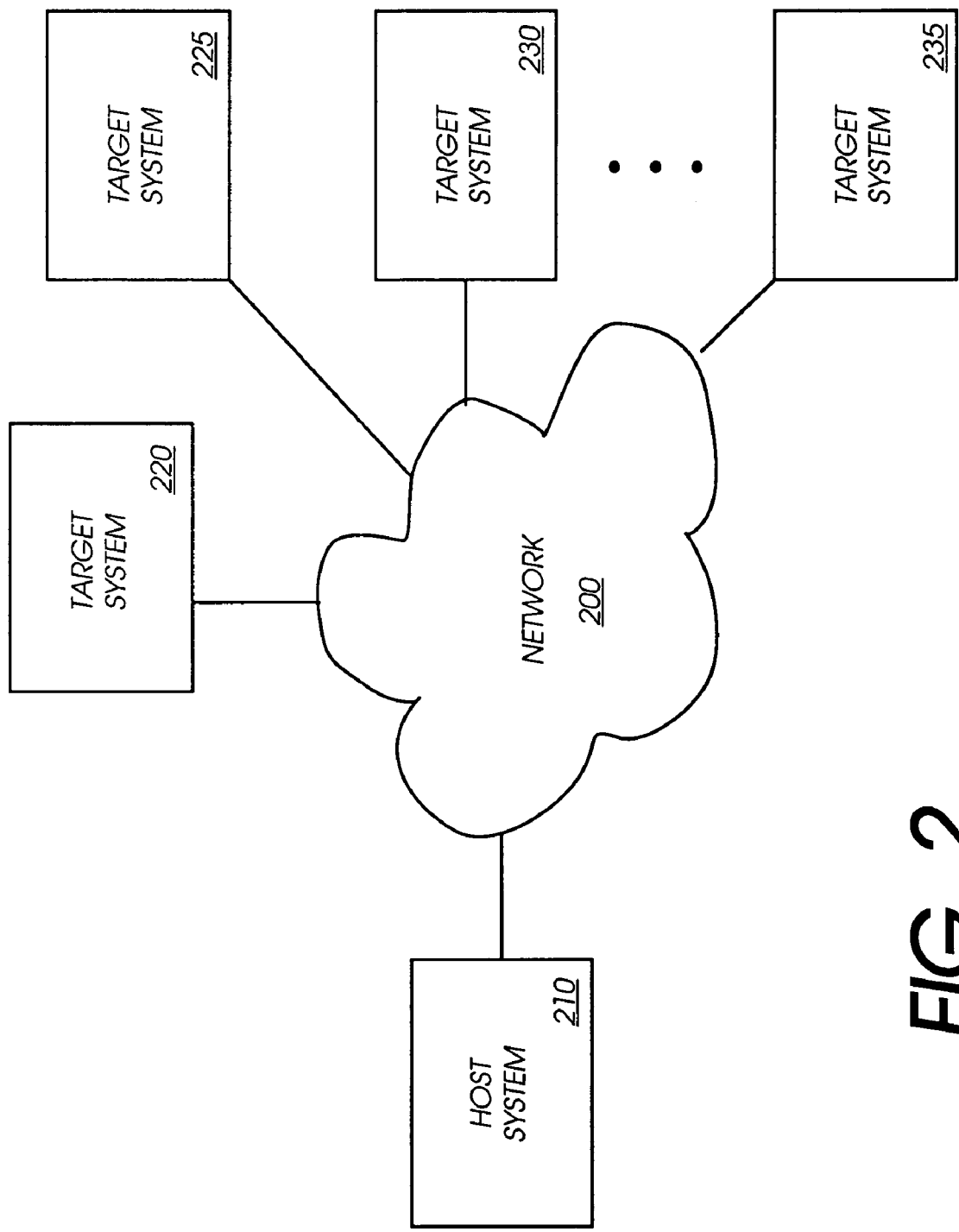
FIG. 2 is a block diagram of a remote management architecture where data can be transferred using multiple protocols.

FIG. 2 is a block diagram of a remote management architecture where data can be transferred using multiple protocols. Network 200 provides an interconnection between multiple electronic systems. Network 200 can be any type of one or more networks. Network 200 can communicate data in any manner known in the art. In one embodiment, network 200 represents the Internet and a local area network (LAN). In an alternate embodiment, network 200 represents a telephone network and a LAN. In another alternate embodiment, network 200 represents one or more LANs.

Host system 210 is a computer system or other electronic system that provides data to one or more target systems over network 200. In one embodiment, host system 210 provides remote management, software upgrades/modifications, or other remote services to target systems 220, 225, 230 and 235. Any number of target systems can be supported.

Use of multiple protocols can be used to transmit data from host system 210 to target systems 220, 225, 230 and 235. The data can represent any type of machine readable data, for example, application programs, system files, or text files. In one embodiment, host system 210 transmits data to target systems 220, 225, 230 and 235 via a multicasting protocol.

Multicasting allows data to be transmitted from a single source (e.g., host system 210) to multiple target systems (e.g., target systems 220, 225, 230 and 235) that are a subset of all network nodes. In other words, multicasting allows data to be transmitted to multiple target systems without broadcasting the data to all systems coupled to a network. Multicast is one of the packet types in the Internet Protocol Version 6, which is described in Internet Engineering Task Force at the Toronto (IETF) Request for Comments (RFC) 1752, entitled "The Recommendation for the IP Next Generation Protocol", January 1995.

Multicasting is a non-reliable data transport protocol because data is transmitted to multiple target systems without a mechanism for guaranteeing delivery or retransmission of data that is not successfully transmitted and received. Thus, multicasting is typically used for data in which packets of data can be lost, for example, audio and video data streams. Multicasting provides a relatively low overhead technique for distribution of data to multiple target systems. However, non-reliable data transmission protocols alone cannot be used for transmission of data that is critical to operation.

As described in greater detail below, reliable transport protocols can be used to transmit data that was not received by target systems using the non-reliable transport protocol. For example, individual target systems can determine packets or blocks of data not received from the host system using the non-reliable transport protocol. The target systems can request the missing data from the host system and receive the requested data via a reliable transport protocol, for example, HTTP.

The table below compares the efficiency of transferring 500 kbytes of data using HTTP alone and a multicast/HTTP combination. The number of bytes shown represents the amount of raw data the is to be transferred and does not consider the overhead of the various protocol headers. For the purposes of this table, it is assumed that 80% of the multicast data is received.

| Number of Targets | HTTP Alone | Multicast/HTTP | Bandwidth Savings |
| --- | --- | --- | --- |
| 2 Computers | 1,000 kbytes | 600 kbytes | 40.0% |
| 5 Computers | 2,500 kbytes | 900 kbytes | 64.0% |
| 10 Computers | 5,000 kbytes | 1,400 kbytes | 72.0% |
| 50 Computers | 25,000 kbytes | 5,400 kbytes | 78.4% |

Thus, combining the efficiency of a multicast or broadcast protocol with the reliability of a point to point protocol can recognized significant saving in the total bandwidth used for transferring data.

Data transfer can be completed using the second network protocol soon after completion of the transfer using the first network protocol or at some later time. For example, before leaving on a business trip, a laptop user can begin downloading a file from a server using an IPX protocol. The user can leave at any time during the download without waiting for the download to complete. When the user reaches his/her destination, missing data can be downloaded using a second network protocol, for example, multicast. The second download session can, but is not required to, complete the file being downloaded. During a third download session the user can continue downloading the file using IPX, multicast, or any other network protocol.

Figure 3:
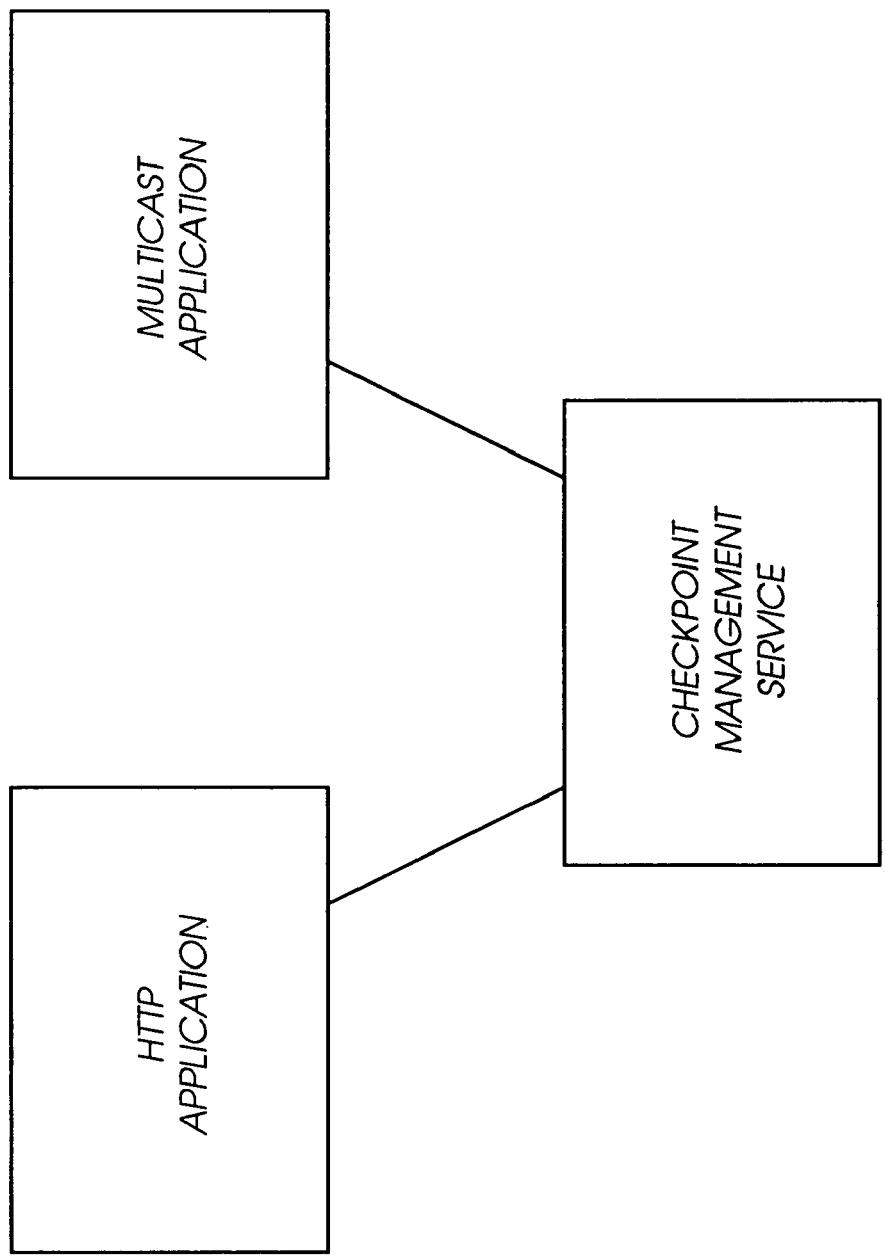
FIG. 3 is a conceptual illustration of a multicast application and a HTTP application interacting with a checkpoint management service to provide technique for data transmission using multiple protocols.

FIG. 3 is a conceptual illustration of a multicast application and a HTTP application interacting with a checkpoint management service to provide technique for data transmission using multiple protocols. Multicast (or other non-reliable transport protocol) application 300 provides data to multiple target systems in any manner known in the art.

Checkpoint management service 310 tracks data received by the target systems. In one embodiment, a checkpoint management service exists for each target system. The checkpoint management services can be maintained within a memory by the respective target systems, or the checkpoint management services can be maintained in another way.

Checkpoint management service 310 can be an active or a passive service. An active checkpoint management service monitors data received by a target system to track data received by the target system. A passive checkpoint management service is updated periodically (e.g., after a disk write operation) to reflect the data received by the target system.

If checkpoint management service 310 indicates that a portion of the transmitted data was not received by the target system, HTTP (or other non-reliable transport protocol) application 320 is used to retrieve the missing data. The reliable transport protocol is used to ensure that the missing data is received by target system as a result of the second transmission.

Checkpoint management service 310 can be either active or passive in the process of retrieving the missing data. Whether checkpoint management service 310 is active or passive in the process of retrieving the missing data is independent of whether checkpoint management service 310 is active or passive in tracking data received by a target system. An active checkpoint management service causes HTTP application 320 to retrieve the missing data at the conclusion of the multicast transmission. A passive checkpoint management service is checked by HTTP application 320 to determine whether any data was not received as a result of the multicast transmission.

Checkpoint management service 310 can store, or track the storage of non-contiguous pieces of the file being received. Thus, checkpoint management service 310 can receive whatever data is available via a first network protocol, whether contiguous or not, and request the missing blocks of data at a later time using a second network protocol.

Figure 4:
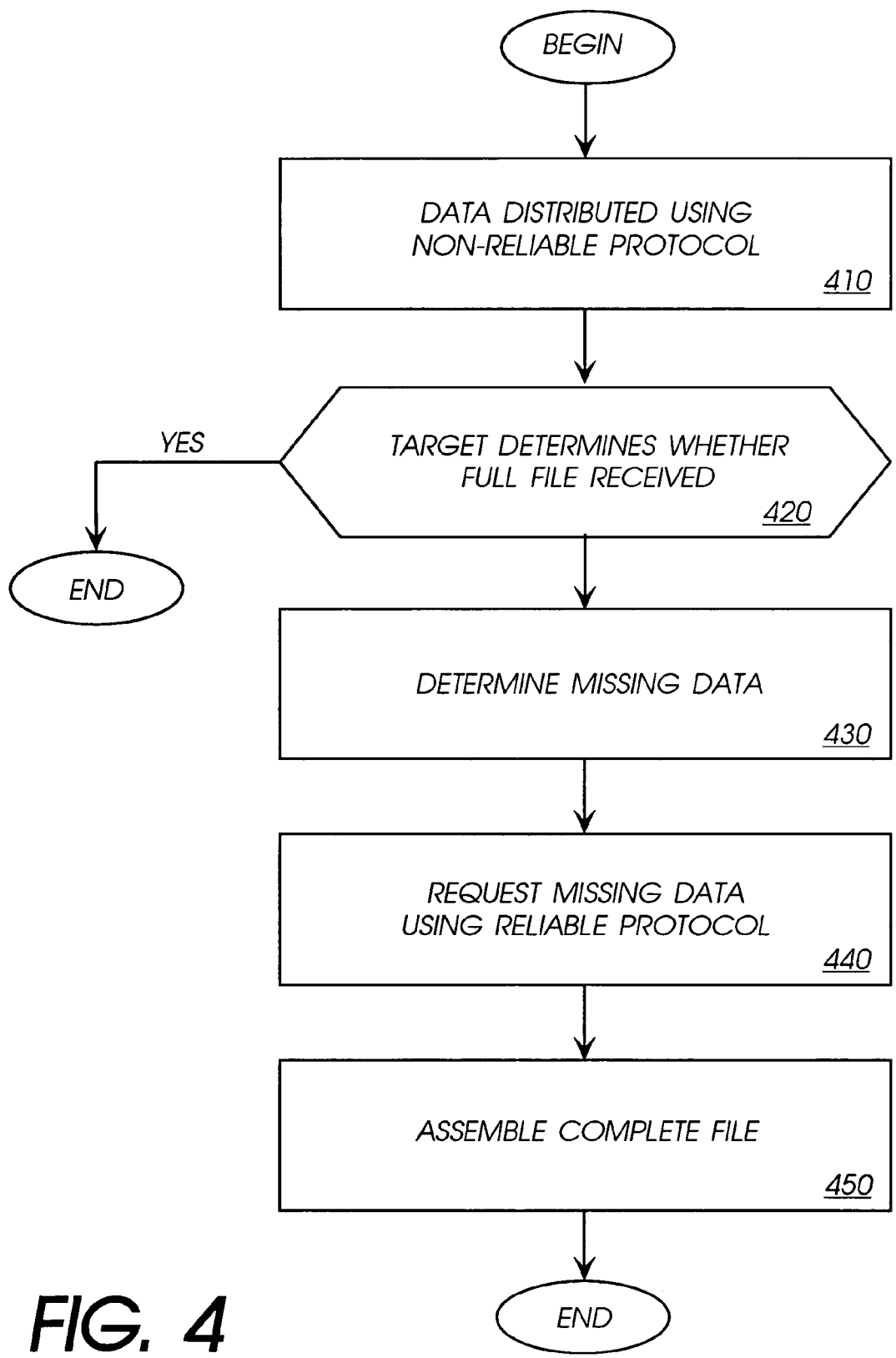
FIG. 4 is a flow diagram of one embodiment of data communication using multiple protocols.

FIG. 4 is a flow diagram of one embodiment of data communication using multiple protocols. Data is distributed using a non-reliable protocol at 410. For example, a host computer at a central office can multicast data to multiple target computers at a remote office using a non-reliable protocol. As another example, data can be transmitted from a host computer in a central office to a single target computer at a remote office using a reliable protocol. The single target computer at the remote office can then act as a host computer to distribute the data to multiple target computers at the remote office. Other distribution techniques can be implemented using a non-reliable protocol for at least a portion of the distribution.

Target systems determine whether the full file was received via the non-reliable distribution at 420. Missing data, if any, is determined at 430. In one embodiment, the target systems are provided with a file size. After the non-reliable transmission is stopped, the target system can compare the amount of data against the file size to determine whether the complete file was received. In an alternate embodiment, each packet that is received by the target system is logged to track the specific data that is received. The missing packets can be determined based on the sequence of the received packets. Other techniques for determining whether a full file is received and what data is missing can be used.

The missing data is requested using a reliable protocol at 440. In one embodiment, each target system individually requests the missing data from the host system. In an alternate embodiment, multiple target systems can collectively request missing data from the host system to further reduce the bandwidth consumed by data distribution. The target systems assemble complete files 450. The complete files can then be used by the target systems for their intended purposes.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   transmitting data over a network using a first network protocol from a host electronic system to one or more target electronic systems;
   determining data not received by at least one of the target electronic systems using the first network protocol; and
   requesting, from the host electronic system, the data not received by at least one of the target electronic systems be transmitted using a second network protocol.

2. The method of claim 1 wherein the first network protocol is a non-reliable network protocol.

3. The method of claim 2 wherein the non-reliable network protocol comprises one of a broadcast protocol and a multicast protocol.

4. The method of claim 1 wherein the second network protocol is a reliable network protocol.

5. The method of claim 1, wherein determining data not received by at least one of the target electronic systems further comprises logging, with a checkpoint management service, packets of data received by the target electronic systems.

6. An article comprising a machine readable medium having stored thereon sequences of instructions that, when executed, cause one or more electronic systems to:
   transmit data over a network using a first network protocol from a host electronic system to one or more target electronic systems;
   determine data not received by at least one of the target electronic systems using the first network protocol; and
   request, from the host electronic system, the data not received by at least one of the target electronic systems be transmitted using a second network protocol.

7. The article of claim 6 wherein the first network protocol is a non-reliable network protocol.

8. The article of claim 6 wherein the non-reliable network protocol comprises one of a broadcast protocol and a multicast protocol.

9. The article of claim 6 wherein the second network protocol is a reliable network protocol.

10. The article of claim 6, wherein the sequences of instructions that cause the one or more electronic systems to determine data not received by at least one of the target electronic systems further comprise sequences of instructions that, when executed, cause the one or more electronic systems to log, with a checkpoint management service, packets of data received by the target electronic systems.

11. A computer data signal embodied in a data communications medium shared among a plurality of network devices comprising sequences of instructions that, when executed, cause one or more electronic systems to:
    transmit data over a network using a first network protocol from a host electronic system to one or more target electronic systems;
    determine data not received by at least one of the target electronic systems using the first network protocol; and request, from the host electronic system, the data not received by at least one of the target electronic systems be transmitted using a second network protocol.

12. The computer data signal of claim 11 wherein the first network protocol is a non-reliable network protocol.

13. The computer data signal of claim 11 wherein the non-reliable network protocol comprises one of a broadcast protocol and a multicast protocol.

14. The computer data signal of claim 11, wherein the sequences of instructions that cause the one or more electronic systems to determine data not received by at least one of the target electronic systems further comprise sequences of instructions that, when executed, cause the one or more electronic systems to log, with a checkpoint management service, packets of data received by the target electronic systems.

15. The article of claim 11 wherein the second network protocol is a reliable network protocol.

16. A method comprising:
    transmitting a predetermined set of data using a first network protocol to multiple target systems;
    receiving one or more requests from at least one target system for a subset of data from the predetermined set of data;
    transmitting the one or more subsets of data to at least one target system using a second network protocol.

17. The method of claim 16 wherein transmitting a predetermined set of data using a first network protocol to multiple target systems comprises logging transmitted packets of data with a checkpoint management service for one or more of the target systems.

18. The method of claim 16 wherein the first network protocol comprises a non-reliable network protocol.

19. The method of claim 16 wherein the second network protocol comprises a reliable network protocol.

20. An article comprising a machine readable medium having stored thereon sequences of instructions that, when executed, cause one or more electronic systems to:
    transmitting a predetermined set of data using a first network protocol to multiple target systems;
    receiving one or more requests from at least one target system for a subset of data from the predetermined set of data;
    transmitting the one or more subsets of data to at least one target system using a second network protocol.

21. The article of claim 20 wherein the sequences of instructions that cause the one or more electronic systems to transmit a predetermined set of data using a first network protocol to multiple target systems comprise sequences of instructions that, when executed, cause the one or more electronic systems to log transmitted packets of data with a checkpoint management service for one or more of the target systems.

22. The article of claim 20 wherein the first network protocol comprises a non-reliable network protocol.

23. The article of claim 20 wherein the second network protocol comprises a reliable network protocol.

24. A method comprising:
    receiving at least a portion of a predetermined set of data from a host system using a first network protocol;
    generating one or more requests from for subsets of data from the predetermined set of data;
    receiving the subsets of data from the host system using a second network protocol.

25. The method of claim 24 wherein the first network protocol comprises a non-reliable network protocol.

26. The method of claim 24 wherein the second network protocol comprises a reliable protocol.

27. An article comprising a machine readable medium having stored thereon sequences of instructions that, when executed, cause one or more electronic systems to:
    receive at least a portion of a predetermined set of data from a host system using a first network protocol;
    generate one or more requests from for subsets of data from the predetermined set of data;
    receive the subsets of data from the host system using a second network protocol.

28. The article of claim 27 wherein the first network protocol comprises a non-reliable network protocol.

29. The article of claim 27 wherein the second network protocol comprises a non-reliable network protocol.

* * * * *